(12) United States Patent
Schneider

(10) Patent No.: US 6,502,821 B2
(45) Date of Patent: Jan. 7, 2003

(54) AUTOMOTIVE BODY PANEL DAMPING SYSTEM

(75) Inventor: Dean Jeffrey Schneider, Washington, MI (US)

(73) Assignee: L&L Products, Inc., Romeo, MI (US)

( * ) Notice: Subject to any disclaimer, the term of this patent is extended or adjusted under 35 U.S.C. 154(b) by 32 days.

(21) Appl. No.: 09/859,126

(22) Filed: May 16, 2001

(65) Prior Publication Data

US 2002/0171260 A1 Nov. 21, 2002

(51) Int. Cl.$^7$ .................................................. B60J 5/04
(52) U.S. Cl. ..................................... 276/146.6; 296/191
(58) Field of Search ............................... 296/187, 191, 296/146.5, 146.6

(56) References Cited

U.S. PATENT DOCUMENTS

| | | |
|---|---|---|
| 1,814,677 A | 7/1931 | Fennema |
| 3,649,375 A | 3/1972 | Venkatesan |
| 3,868,796 A | 3/1975 | Bush |
| 4,029,128 A | 6/1977 | Yamagishi |
| 4,083,384 A | 4/1978 | Horne |
| 4,378,395 A | 3/1983 | Asoshina et al. |
| 4,440,434 A | 4/1984 | Celli |
| 4,444,818 A * | 4/1984 | Tominaga et al. ........... 296/191 |
| 4,463,870 A | 8/1984 | Coburn, Jr. et al. |
| 4,610,836 A | 9/1986 | Wycech |
| 4,695,343 A | 9/1987 | Wycech |
| 4,732,806 A | 3/1988 | Wycech |
| 4,751,249 A | 6/1988 | Wycech |

(List continued on next page.)

FOREIGN PATENT DOCUMENTS

| | | |
|---|---|---|
| DE | 29 19 046 | 11/1980 |
| DE | 198 12 288 C1 | 5/1999 |

(List continued on next page.)

OTHER PUBLICATIONS

Copending U.S. Application Serial No. 09/655,965 filed Sep. 6, 2000.
Copending U.S. Application Serial No. 09/858,939 filed May 16, 2001.
Copending U.S. Application Serial No. 09/923,138 filed Aug. 6, 2001.
Copending U.S. Application Serial No. 60/317,009 filed Sep. 4, 2001.
Copending U.S. Application Serial No. 09/428,243 filed Oct. 27, 1999.
Copending U.S. Application Serial No. 09/459,756 filed Dec. 10, 1999.
Copending U.S. Application Serial No. 09/502,686 filed Feb. 11, 2000.
Copending U.S. Application Serial No. 09/524,298 filed Mar. 14, 2000.
Copending U.S. Application Serial No. 09/524,961 filed Mar. 14, 2000.
Copending U.S. Application Serial No. 09/631,211 filed Aug. 3, 2000.

*Primary Examiner*—Stephen Gordon
*Assistant Examiner*—H. Gutman
(74) *Attorney, Agent, or Firm*—Dobrusin & Thennisch PC

(57) ABSTRACT

An automotive vehicle vibration reduction and damping system for use in an automotive body panel assembly having an inner body panel and an outer body panel is disclosed. An expandable material, such as a polymer-based foamable material, is disposed on at least one edge of a damping member mounted to at least a portion of the body panel assembly. The system is activated as the vehicle undergoes the final vehicle assembly process and paint operation which activates and transforms the expandable material to expand, bond and structurally adhere the damping member with the body panel assembly for vibrational damping and noise reduction.

29 Claims, 3 Drawing Sheets

U.S. PATENT DOCUMENTS

| | | |
|---|---|---|
| 4,769,391 A | 9/1988 | Wycech |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,901,395 A | 2/1990 | Semrau |
| 4,901,500 A | 2/1990 | Wycech |
| 4,908,930 A | 3/1990 | Wycech |
| 4,922,596 A | 5/1990 | Wycech |
| 4,923,902 A | 5/1990 | Wycech |
| 4,946,737 A | 8/1990 | Lindeman et al. |
| 4,978,562 A | 12/1990 | Wycech |
| 4,984,406 A | 1/1991 | Friesen |
| 4,995,545 A | 2/1991 | Wycech |
| 5,040,803 A | 8/1991 | Cieslik et al. |
| 5,072,952 A | 12/1991 | Irrgeher et al. |
| 5,102,188 A | 4/1992 | Yamane |
| 5,124,186 A | 6/1992 | Wycech |
| 5,213,391 A | 5/1993 | Takagi |
| 5,266,133 A | 11/1993 | Hanley et al. |
| 5,358,397 A | 10/1994 | Ligon et al. |
| 5,373,027 A | 12/1994 | Hanley et al. |
| 5,382,397 A | 1/1995 | Turner, Jr. |
| 5,506,025 A * | 4/1996 | Otto et al. ..................... 428/98 |
| 5,553,910 A * | 9/1996 | Park ........................ 296/146.6 |
| 5,575,526 A | 11/1996 | Wycech |
| 5,577,784 A | 11/1996 | Nelson |
| 5,642,914 A | 7/1997 | Takabatake |
| 5,660,116 A * | 8/1997 | Dannawi et al. ............. 296/189 |
| 5,707,098 A | 1/1998 | Uchida et al. |
| 5,755,486 A | 5/1998 | Wycech |
| 5,766,719 A | 6/1998 | Rimkus |
| 5,806,915 A | 9/1998 | Takabatake |
| 5,806,919 A | 9/1998 | Davies |
| 5,819,408 A | 10/1998 | Catlin |
| 5,851,626 A | 12/1998 | McCorry et al. |
| 5,871,849 A | 2/1999 | Lepine |
| 5,878,784 A | 3/1999 | Sales et al. |
| 5,884,960 A | 3/1999 | Wycech |
| 5,888,600 A | 3/1999 | Wycech |
| 5,894,071 A | 4/1999 | Merz et al. |
| 5,901,752 A | 5/1999 | Lundman |
| 5,902,656 A | 5/1999 | Hwang |
| 5,941,597 A | 8/1999 | Horiuchi et al. |
| 5,985,435 A | 11/1999 | Czaplicki et al. |
| 5,988,734 A | 11/1999 | Longo et al. |
| 5,992,923 A | 11/1999 | Wycech |
| 5,997,077 A * | 12/1999 | Siebels et al. ........... 296/146.6 |
| 6,003,274 A | 12/1999 | Wycech |
| 6,006,484 A | 12/1999 | Geissbuhler |
| 6,033,300 A | 3/2000 | Schneider |
| 6,050,630 A | 4/2000 | Hochet |
| 6,053,210 A | 4/2000 | Chapman et al. |
| 6,058,673 A * | 5/2000 | Wycech ..................... 52/721.4 |
| 6,059,342 A | 5/2000 | Kawai et al. |
| 6,068,424 A | 5/2000 | Wycech |
| 6,073,991 A | 6/2000 | Naert |
| 6,079,180 A | 6/2000 | Wycech |
| 6,092,864 A | 7/2000 | Wycech et al. |
| 6,096,403 A | 8/2000 | Wycech |
| 6,099,948 A | 8/2000 | Pever, Jr. |
| 6,103,341 A | 8/2000 | Barz et al. |
| 6,103,784 A | 8/2000 | Hilborn et al. |
| 6,129,410 A | 10/2000 | Kosaraju et al. |
| 6,131,897 A | 10/2000 | Barz et al. |
| 6,135,541 A * | 10/2000 | Geise et al. ............. 296/146.6 |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,174,932 B1 | 1/2001 | Pachl et al. |
| 6,189,953 B1 | 2/2001 | Wycech |
| 6,196,621 B1 | 3/2001 | VanAssche et al. |
| 6,197,403 B1 | 3/2001 | Brown et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,247,287 B1 | 6/2001 | Takabatake |
| 6,253,524 B1 * | 7/2001 | Hopton et al. .............. 296/187 |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,277,898 B1 | 8/2001 | Pachl et al. |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 * | 10/2001 | Hopton et al. ........... 296/146.6 |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,368,438 B1 | 4/2002 | Chang et al. |
| D457,120 S | 5/2002 | Broccardo et al. |
| 2001/0020794 A1 | 9/2001 | Ishikawa |
| 2002/0033617 A1 * | 3/2002 | Blank ........................ 296/187 |
| 2002/0033618 A1 * | 3/2002 | Kwon .................. 296/203.03 |
| 2002/0053179 A1 | 5/2002 | Wycech |
| 2002/0054988 A1 | 5/2002 | Wycech |
| 2002/0074827 A1 | 6/2002 | Fitzgerald et al. |

FOREIGN PATENT DOCUMENTS

| | | |
|---|---|---|
| DE | 198 56 255 C1 | 1/2000 |
| EP | 0 061 131 A2 | 9/1982 |
| EP | 0 414 302 A1 | 2/1991 |
| EP | 0 453 777 A2 | 10/1991 |
| EP | 0 611 778 A3 | 1/1994 |
| EP | 0 679 501 A1 | 11/1995 |
| EP | 0 775 721 A1 | 5/1997 |
| EP | 0 891 918 A1 | 1/1999 |
| EP | 0 893 331 A1 | 1/1999 |
| EP | 0 893 332 A1 | 1/1999 |
| EP | 0 697 956 B1 | 6/1999 |
| EP | 0 893 332 B1 | 3/2002 |
| FR | 2 539 693 | 7/1984 |
| FR | 2 749 263 | 12/1997 |
| GB | 628 863 | 3/1947 |
| GB | 2 061 196 | 5/1981 |
| GB | 2 156 412 | 10/1985 |
| GB | 2 197 267 | 5/1988 |
| JP | 61118211 A2 | 6/1986 |
| JP | 01069309 | 9/1987 |
| JP | 01069308 A2 | 3/1989 |
| JP | 01164867 A2 | 6/1989 |
| JP | 02206537 A2 | 8/1990 |
| JP | 404300715 * | 10/1992 .............. 296/146.6 |
| JP | 5-38992 A2 | 2/1993 |
| JP | 404300716 * | 10/1999 .............. 296/146.6 |
| JP | 2001191947 | 7/2001 |
| JP | 02001191949 A | 7/2001 |
| WO | WO 87/01978 | 4/1987 |
| WO | WO 89/06595 | 7/1989 |
| WO | WO 93/05103 | 3/1993 |
| WO | WO 95/32110 | 11/1995 |

| | | | | | | |
|---|---|---|---|---|---|---|
| WO | WO 97/02967 | 1/1997 | | WO | WO 00/37230 | 6/2000 |
| WO | WO 97/43501 | 11/1997 | | WO | WO 00/37239 | 6/2000 |
| WO | WO 98/36944 | 8/1998 | | WO | WO 00/37241 | 6/2000 |
| WO | WO 98/50221 | 11/1998 | | WO | WO 00/37242 | 6/2000 |
| WO | WO 99/08854 | 2/1999 | | WO | WO 00/37243 | 6/2000 |
| WO | WO 99/28575 | 6/1999 | | WO | WO 00/37302 | 6/2000 |
| WO | WO 99/36243 | 7/1999 | | WO | WO 00/37554 | 6/2000 |
| WO | WO 99/48746 | 9/1999 | | WO | WO 00/38863 | 7/2000 |
| WO | WO 99/50057 | 10/1999 | | WO | WO 00/39232 | 7/2000 |
| WO | WO 99/61216 | 12/1999 | | WO | WO 00/40629 | 7/2000 |
| WO | WO 99/61236 | 12/1999 | | WO | WO 00/40815 | 7/2000 |
| WO | WO 99/61237 | 12/1999 | | WO | WO 00/43254 | 7/2000 |
| WO | WO 99/61281 | 12/1999 | | WO | WO 00/46461 | 8/2000 |
| WO | WO 99/61287 | 12/1999 | | WO | WO 00/52086 | 9/2000 |
| WO | WO 99/64287 | 12/1999 | | WO | WO 00/55444 | 9/2000 |
| WO | WO 00/03894 | 1/2000 | | WO | WO 00/68041 | 11/2000 |
| WO | WO 00/12571 | 3/2000 | | WO | WO 01/54936 | 8/2001 |
| WO | WO 00/12595 | 3/2000 | | WO | WO 01/56845 | 8/2001 |
| WO | WO 00/13876 | 3/2000 | | WO | WO 01/57130 | 8/2001 |
| WO | WO 00/13958 | 3/2000 | | WO | WO 01/71225 | 9/2001 |
| WO | WO 00/17000 | 3/2000 | | WO | WO 01/83206 | 11/2001 |
| WO | WO 00/20483 | 4/2000 | | | | |
| WO | WO 00/27920 | 5/2000 | | * cited by examiner | | |

AUTOMOTIVE BODY PANEL DAMPING SYSTEM

FIELD OF THE INVENTION

The present invention relates generally to improved methods, parts, and systems for reducing noise and vibration characteristics in an automotive vehicle. More particularly, the invention relates to an anti-vibration damping device or system integrated along at least a portion of an automotive body panel assembly resulting in the reduction of vibration, the improvement of sound absorption characteristics, and enhancement of appearance of the exterior portion of outer body panels of automotive vehicles.

BACKGROUND OF THE INVENTION

Traditional automotive vehicle assembly operations generally require a number of specific pre-assembly manufacturing steps or processes, which occur prior to final assembly of the vehicle. Typically, one step or process involves the application of chemical compositions to the unseen or interior portions of an automotive body panel assembly in an effort to reduce vibration and movement of the automotive body panel once it is integrated within the vehicle by the manufacturer. This process typically requires the vehicle manufacturer to allocate tooling and manufacturing facilities for the application of such chemical compositions at either a separate stamping facility where the body panel is assembled or in the vehicle assembly plant during final production. One such technique employs the use of pumpable products applied to the body panel in the form of "wet" compositions, which can remain tacky or may otherwise be applied to the selected panel in a non-uniform manner. For instance, one popular technique utilizes a pumpable product consisting of a thermally activated polymeric material which upon heat activation expands and fills a space or cavity defined between the inner and outer portions of the chosen panel of an automotive vehicle. Another technique found in the prior art utilizes the application of a pressure sensitive patch to an inner portion of an outer body panel.

While these prior art devices perform well and are advantageous in many circumstances, they often require a large capital investment to integrate the pumpable product into the chosen manufacturing facility, utilize a large amount of floor space and maintenance clean-up resources at the stamping facility or final vehicle assembly plant, and require an additional manufacturing process and labor demand. In turn, the manufacturer is required to devote both financial and technical resources to develop tooling for delivering the pumpable product as well as transportation costs, which adds potential cost and delay, particularly if changes to the vehicle structure are implemented during the design stages.

The pressure sensitive patch system also requires an additional manufacturing step, tooling costs, and attendant labor demand at the stamping facility or vehicle assembly plant to insert the patch to the chosen body panel. Further, the aesthetic qualities and overall appearance of the exterior portion of outer body panels of the vehicle is potentially reduced or diminished when utilizing the patch system due to differences in the thermal expansion and cycling characteristics of the patch material and the exterior portion of the outer body panel. In this regard, exposure to the heat typically encountered in a conventional automotive paint operation serves to thermally expand both the patch material and the outer body panel so that the patch material expands into contact with the outer body panel to absorb the vibrational energy. However, differences in thermal characteristics between the materials may cause an outline or profile of the patch to be visible or read through the exterior portion of the outer body panel of the vehicle due to thermal contraction of the panel against the expanded and cured patch material.

Accordingly, there is need for a simple low cost system that provides an integrated anti-vibration damping material within an automotive body panel assembly to reduce vibration characteristics and which can be employed across a wide range of different sizes or shapes of body panel configurations and applications found in automotive vehicles.

SUMMARY OF THE INVENTION

The present invention is directed to a damping or vibration reduction system, and particularly one for automotive vehicle frame structures, such as (without limitation) body panel assemblies of automotive vehicles. In a particularly illustrative and non-limiting embodiment, the system of the present invention is utilized in body panels found in an automotive door assembly for the damping or reduction in vibration of the outer door panel as it is opened and closed. The system generally employs at least one damping member, which is attached or adhered to at least one portion of the panel assembly such as the inner body panel, an interior or inner portion of the outer body panel, or an intrusion beam disposed between the inner and outer body panels of the selected body panel assembly. The damping member or plurality of members can be configured or shaped in any selected form, design, or shape corresponding to the chosen space or panel requiring vibrational damping. The member has at least one exterior edge or surface suitable for receiving an application of an expandable material. It is contemplated that the expandable material disclosed in the present invention functions as an anti-vibration damper when expanded and bonded in a radial direction from the damping member to an inner or interior portion of an outer body panel when the panel assembly is processed through electrocoating, and paint cycles in a vehicle assembly plant. After expansion and curing, the expandable material disposed along the damping member remains in fixed contact with the outer body panel of the automotive vehicle thereby absorbing and transferring vibrational energy from the outer body panel and reducing vibrational movement.

In the illustrative embodiment of the automotive door assembly, at least one damping member having anti-vibration expandable material disposed along at least a portion of the damping member is snap-fit mounted or otherwise attached to an intrusion beam having a first end and a second end disposed and mounted between an inner door panel and an outer door panel of an automotive door assembly fixedly bridging the assembly. The expandable material disposed on the exterior edge or surface of the damping member expands and bonds the intrusion beam with either or both of the inner and outer door panels when the intrusion beam (now attached to the vehicle in the final assembly operation) is processed through e-coat and paint operation cycles in a vehicle assembly plant.

In one embodiment, the material is heat expandable and at least partially fills the cavity by structurally bonding the intrusion beam and the outer door panel, and possibly the inner door panel depending upon the size and shape of the door cavity, during the painting operation thereby reducing noise and vibration characteristics of the vehicle as well as producing a more quite door assembly when the vehicle door is opened and closed. In another embodiment, the material is a melt-flow material, and upon the application of heat will spread over a surface. The selected expandable material can provide a variety of characteristics including structural reinforcement, acoustical damping, vibrational reduction, or any combination thereof.

The present invention further serves to eliminate handling or disposal issues often encountered in the use of a pumpable product process or application of "wet" chemical technology in either a pre-assembly stamping facility or a vehicle assembly plant. The anti-vibration expandable material can be extruded or mini-application bonded onto the damping member in either a pre-production setting or the final vehicle assembly operation. The damping member, with the expandable material disposed along the edges or surface of the member, is then attached or adhered to the selected body panel assembly prior to the e-coat or paint operation processing. Hence, the present invention can be utilized by either the body panel manufacturer or the vehicle manufacturer during final assembly with reduced labor, maintenance requirements, and floor space demand. In addition, upon activation in the e-coat or paint operation process, the expandable material placed along the damping member provides seamless reinforcement and vibrational reduction of the outer body panel, which does not affect the exterior visual appearance of the automotive vehicle.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

Figure 1:
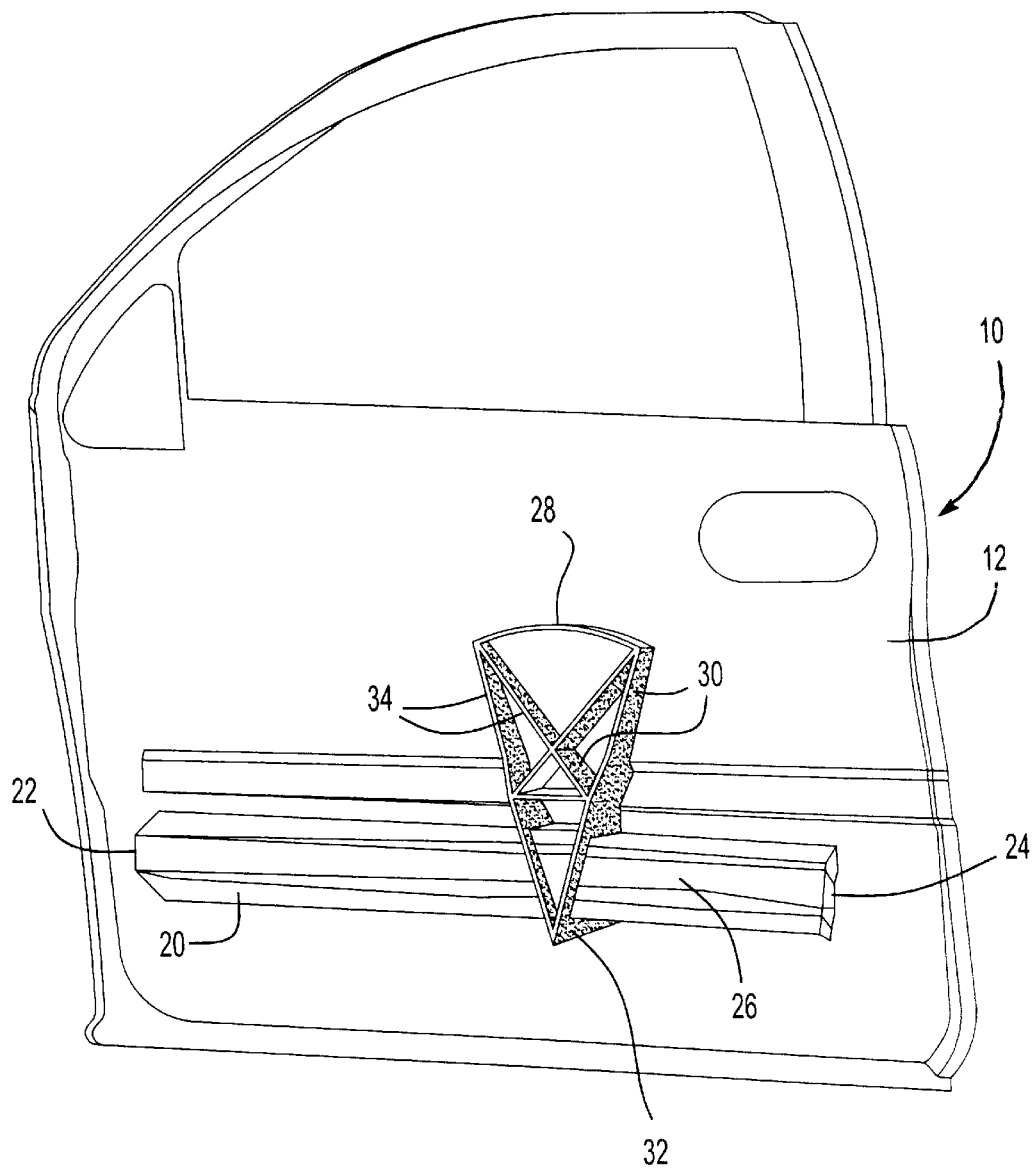
FIG. 1 is a perspective view of interior portions of an automotive door panel assembly depicting features of the vibration damping system in accordance with the teachings of the present invention.

The present invention relates to methods, devices, and systems for reinforcing and reducing vibrational characteristics of automotive vehicles, and particularly body panel assemblies of automotive vehicles such as door assemblies and other body panels, which are viewable from the exterior of the vehicle. In one embodiment, at least one damping member is attached, affixed, adhered, or snap-fit to an intrusion beam of an automotive vehicle. The at least one damping member has at least one edge or surface which includes an expandable material or structural foam supported by the edge or surface of the damping member. The damping member or plurality of damping members may be configured in a number of sizes, shapes, and dimensions corresponding to the cavity defined by the selected body panel assembly. The damping member may have a uniform cross-section along one or more of its dimensions, or it may have a first dimension and a second dimension that varies along the second dimension. In addition, the damping member may include at least two spaced apart walls joined together by at least one cross member or at least one generally x-shaped or other suitable cross member. The expandable material extends along at least a portion of the length of the edges or surface of the damping member for joining the damping member to the body panel along the edges or surface. In one embodiment, the damping member may fill at least a portion of a cavity or space defined between the intrusion beam and the outer door panel of the automotive vehicle. In an alternative embodiment, the present invention is utilized in body panel assemblies that do not have intrusion beams defining a cavity between an inner and outer body panel. In these applications, at least one damping member of the present invention having the expandable material is attached to either or both of the inner body panel and an inner or interior portion of the outer body panel prior to expansion of the expandable material. Upon exposure to heat typically encounted in an automotive e-coat or paint operation, the expandable material activates, flows, and expands from the damping member to the body panel thereby joining the body panel with the damping member.

The expandable material is generally and preferably a heat-activated plastic resin having foamable characteristics upon activation by an external stimulus. For instance, the use of heat typically encountered in an e-coat or other automotive painting operation is preferred as one way to activate foaming. As the resin is heated, it expands, cross-links, and structurally adheres to adjacent surfaces and particularly the edges of the damping member. Preferred structural foam materials are epoxy based formulations, such as those commercially available from L&L PRODUCTS, INC. of Romeo, Mich. under the designation L5204, L5206, L5207, L5208, or L5209. Generally speaking, these automotive vehicle applications may utilize technology and processes such as those disclosed in U.S. Pat. Nos. 4,922,596, 4,978,562, 5,124,186, and 5,884,960 and commonly owned, co-pending U.S. application Ser. Nos. 09/502,686 filed Feb. 11, 2000, 09/524,961 filed Mar. 14, 2000, 60/223,667 filed Aug. 7, 2000, 60/225,126 filed Aug. 14, 2000, 09/676,443 filed Sep. 29, 2000, 09/676,335 filed Sep. 29, 2000, 09/676,725 filed Sep. 29, 2000, and particularly, 09/459,756 filed Dec. 10, 1999, all of which are expressly incorporated by reference.

The system generally employs at least one damping member having edges adapted for stiffening the structure for damping, such as an intrusion beam found in automotive vehicles or, alternatively the body panel assembly itself if the application does not have an intrusion beam, and helping to redirect applied loads and transfer vibrational energy. In use, the damping member or members are mechanically attached, snap-fit, affixed, or adhered by adhesive onto an intrusion beam or directly to either or both of the inner or outer body panels with the heat activated expandable material serving as the load transferring and potentially energy absorbing medium disposed along the edges and surface of the damping member. However, the attachment means, which serve to retain and position the damping member or members along the intrusion beam or, alternatively, to either or both of the inner or outer body panels, could also comprise an adhesive material along the exterior surface.

In a particularly preferred embodiment, the damping member or members are made from a molded material such as a plastic (e.g. polyamide, such as nylon), metal (such as aluminum, magnesium, titanium, graphite, or carbon as well as an alloy derived from those materials or a foam of these materials or other metal or metallic foams) composite or the like. The damping member has at least one edge of exterior surface that is at least partially coated with an expandable material or bonding medium on at least one of its sides (in some instances all sides). In addition, it is contemplated that the damping member could comprise other materials, such as those set forth in commonly owned U.S. Pat. No. 6,103, 341, expressly incorporated by reference herein.

The members may be cored out to provide a greater mass of material spread over a larger area. The members may be porous, solid, or a combination thereof. Still further, in one embodiment of the damping member is adapted for stiffening a structure, and will include a stamped or formed metal, such as a cold-rolled steel, a stamped and formed high strength low alloy steel, a roll formed cold rolled steel, or a roll formed high strength low alloy steel, or the like.

Any expandable material that is considered structural or damping, or capable of vibrational reduction may be used as the bonding medium. The choice of the expandable material or other bonding medium will be dictated by performance requirements and economics of a specific application. Additional foamable or expandable materials that could be utilized in the present invention include other materials which are suitable as bonding or acoustic media and which may be heat activated foams which generally activate and expand to fill a desired cavity or occupy a desired space or function when exposed to temperatures typically encountered in automotive e-coat curing ovens and other paint operations ovens. Though other heat-activated materials are possible, a preferred heat activated material is an expandable or flowable polymeric formulation, and preferably one that can activate to foam, flow, adhere, or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L PRODUCTS, INC. of Romeo, Mich., under the designations as L-2105, L-2100, L-7005 or L-2018, L-7101, L-7102, L-2411, L-2420, L-4141, etc. and may comprise either open or closed cell polymeric base material.

Further, it is contemplated that the expandable material of the present invention, when activated and expanded through the application of heat, can also assist in the reduction of vibration and noise in the overall automotive body, and particularly the selected body panel such as the door of the vehicle or other body panel that could be viewed from the exterior of the vehicle. Upon activation of the expandable material by exposure to heat from the automotive paint operation, the material flows and expands from the edges of the damping member toward the body panel to join the body panel with the damping member after the material cures. After curing, the body door panel will have increased stiffness which will reduce the natural frequency, measured in hertz, that resonates through the automotive chassis. Such reduced acoustic transmission is at least partially due to the ability to block, absorb, or transfer noise and vibration through the use of the expandable material. By increasing the stiffness and rigidity of the body panel, the noise and frequency of the overall engine ride vibration that occurs from the operation of the vehicle as well as the opening and closing of the panel itself can be reduced since a reduced frequency of noise and vibration will resonate through the chassis. In practice, the vibration and movement of the visible or exterior portion of the outer body panel will be reduced during normal operation of the vehicle door.

Although the use of the vibration damping system of the present invention in the illustrative embodiment is directed to an automotive door assembly having an intrusion beam disposed between an inner door panel and an outer door panel, it is contemplated that the present invention can be utilized in areas of an automotive vehicles having body panel assemblies with or without intrusion beams, such as decklids, hatches, roofs, hoods, fenders, quarter-panels, club cabs, crew cabs, and third doors which are well known in the art. In these applications and embodiments, at least one damping member has at least one edge or surface suitable for application and support of the expandable material that is attached, adhered, or snap-fit directly to either the inner body panel of the body panel assembly or an interior portion of the outer body panel of the body panel assembly. In addition to the use of an acoustically damping material along the edge or surface of the damping member, the present invention could comprise the use of a combination of an acoustically damping material and a structurally reinforcing expandable material along different portions or zones of the damping member or the edges of the damping member depending upon the requirements of the desired application.

It is also contemplated that the foamable or expandable material could be delivered and placed into contact with the damping member or the edges of the damping member through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference, such type of apparatus being referred to herein as a "mini-applicator." A preferred mini-applicator is an extrude-in-place device suitable for extrusion with or without robotic assistance, and which may be portable or remain stationary in a predetermined location. The use of a mini-applicator advantageously allows extrusion of meltable plastic materials of various section sizes or shapes directly at production or assembly lines. In this non-limiting embodiment, the material or medium is at least partially coated with heat-activated polymer that could be structural or acoustic in nature and designed to be applied to the vehicle without impairing the visible or exterior features of the vehicle, such as the body panels, doorsills, windowsills, and other exterior portions. In addition, it is contemplated that the present invention may utilize an application of expandable material directly to a structural member or trim component of an automotive vehicle in an automated or otherwise expedited manufacturing process which may involve heating through traditional methods as well as welding and radiation curable technology or cleaning the selected member or part prior to application to assist in adhesion of the expandable material.

FIG. 1 shows an automotive body panel damping system 10 formed in accordance with the teachings of the present invention. The system 10 imparts increased vibrational damping, strength, stiffness, or durability to structural portions of an automotive vehicle, and, thus, may be used in a variety of applications and configured to fit within body panel assemblies of numerous shape and design. Damping of the selected body panel assembly is accomplished through a combination of stabilizing vibrating portions of the system, reflecting sound energy absorbing sound energy and/or utilizing a damping member in any number of body panel configurations associated with automotive vehicles. For instance, the body panel damping system 10 may be used as part of the door assembly of automotive vehicles as shown in FIG. 1 as well as other automotive body panel applications, such as a hood, trunk, fender, sliding door, or hatch used in vehicles, with or without an intrusion beam.

Figure 2:
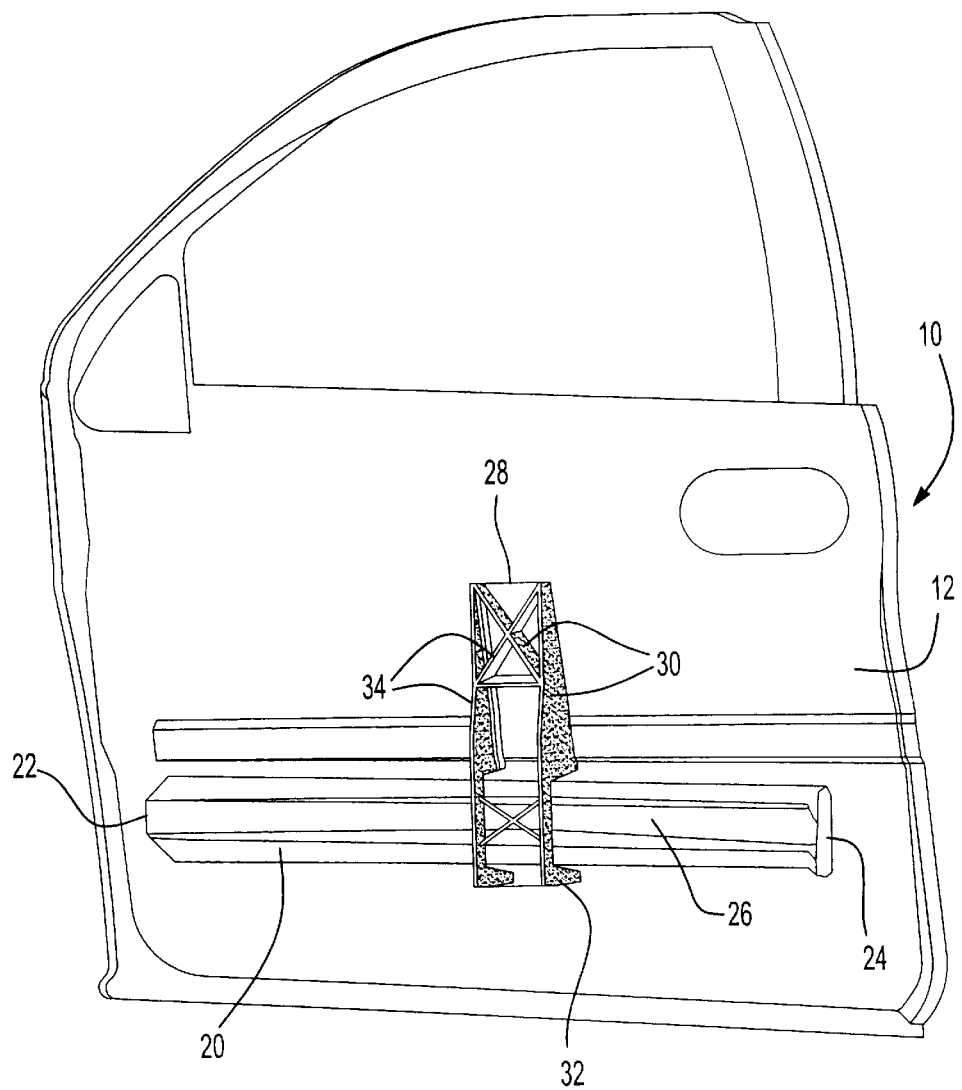
FIG. 2 is a perspective view of interior portions of an automotive door panel assembly showing an alternative design and shape of the member of the present invention in the uncured state attached to at least one of the inner body panel and an intrusion beam prior to activation by heat.
Figure 3:
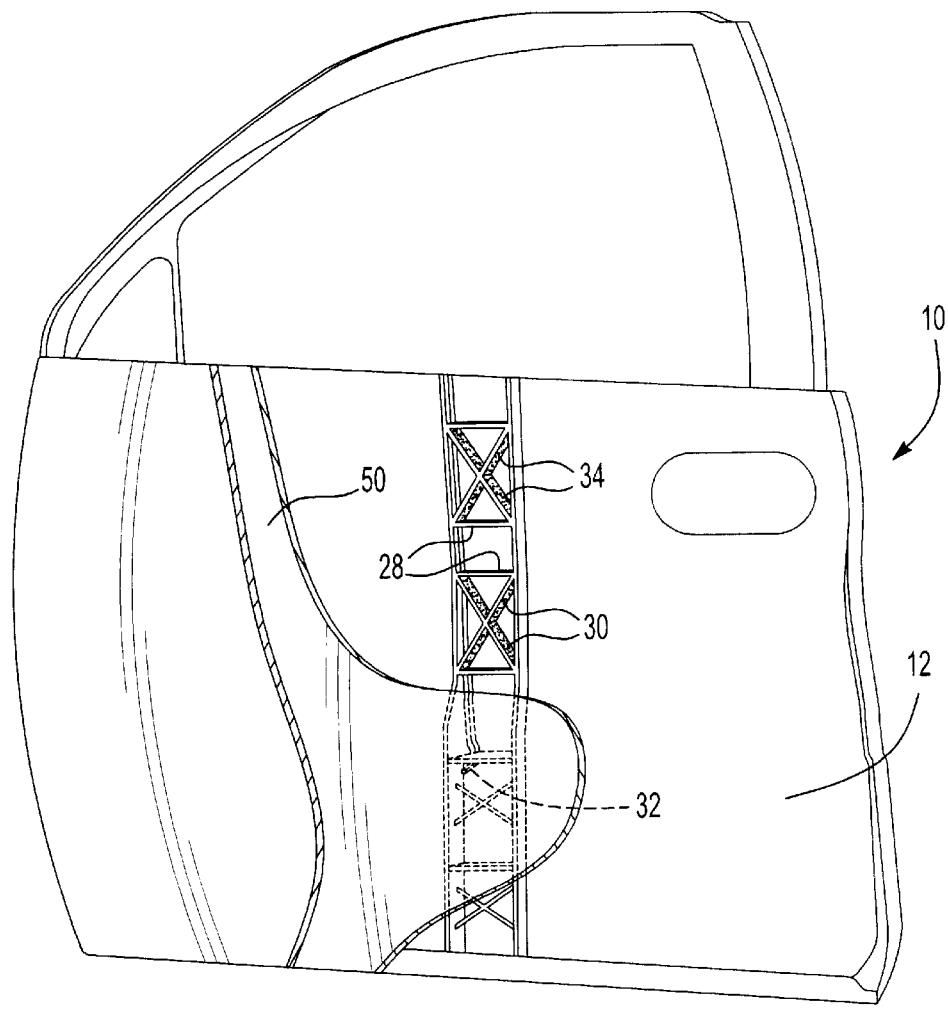
FIG. 3 is a perspective view of an automotive door panel assembly without an intrusion beam showing the member in accordance with the teachings of the present invention attached directly to the inner body panel.

In the illustrative embodiment shown at FIG. 1, the present invention or body panel damping system 10 can be incorporated within an automotive body panel assembly having an inner body panel 12 and an outer body panel not shown which consists of an inner or interior portion and an outer or exterior portion which is viewable from the outside of the vehicle and generally referred to as the exterior or skin of the body panel. As shown at FIG. 1, some automotive body panel assemblies have an intrusion beam 20 having a first end 22 and a second end 24 mounted to at least one of the inner body panel 12 or the outer body panel so that the intrusion beam 20 fixedly bridges the body panel assembly defining a cavity therein. The intrusion beam 20 is further defined as having an exposed surface portion 26 disposed between the first end 22 and the second end 24. The present invention further discloses at least one damping member 28 comprised of an injection molded polymer having at least one exterior edge 34 suitable for supporting an expandable material 30 molded to the edge 34 of the damping member 28. The damping member or plurality of members 28 can be placed upon, attached, or adhered to the exposed surface 26 of the automotive intrusion beam 20 through an attachment means 32 used to affix the member 28 to the intrusion beam 20, such as a snap-fit assembly which is well known in the art. As shown in FIG. 1 and FIG. 2, the damping member 28 can be configured to any chosen size, thickness, and shape depending upon the dimensions of the selected panel assembly and the area chosen for vibrational damping. For instance, the damping member 28 or plurality of damping members 28 may be configured in a number of sizes, shapes, and dimensions corresponding to the cavity defined by the selected body panel assembly. The damping member 28 has a first dimension (e.g. height) and a second dimension (e.g. width) that varies along the first dimension. In addition, the damping member 28 may comprise at least two spaced apart walls joined together by at least one cross wall or at least one generally x-shaped cross wall having a plurality of edges 34 capable of receiving the expandable material 30 as shown in FIG. 1, FIG. 2 and FIG. 3. In addition, the damping member 28 can comprise a plurality of edges 34 for receiving the expandable material 30 depending upon the dimensions, such as width, of the selected body panel assembly as shown in FIG. 2. As shown in FIG. 3, the present invention may also be utilized in body panel assemblies that do not incorporate intrusion beams by using the attachment means 32, such as a snap fit assembly, to place the damping member 28 directly to the inner body panel 12 of the chosen application. Upon exposure to heat typically encountered in an automotive e-coat or paint operation, the expandable material 30 activates, flows, and expands from the damping member 28 to the body panel thereby joining the body panel with the damping member 28.

Although the present invention can be utilized without the presence of an intrusion beam 20, a preferred automotive door assembly embodiment shown at FIG. 1 has an intrusion beam 20 disposed between an inner body panel 12 and an outer body panel of a door panel assembly. The intrusion beam 20 has a first end 22 and a second end 24 fixedly attached to an inner body panel 12 of an automotive door assembly. In this non-limiting embodiment, the selected expandable material 30 consists of an acoustical or frequency damping expandable material 30, which results in either a rigid or semi-rigid attachment. It is contemplated that the expandable material 30 could be applied to at least one damping member 28 in a variety of patterns, shapes, and thicknesses to accommodate the particular size, shape, and dimensions of the cavity corresponding to the chosen body panel assembly or vehicle application as well as the edges 34 of the damping member 28. The expandable material 30 is activated to accomplish expansion through the application of heat typically encountered in an automotive e-coat oven or other heating operation in the space defined between the damping member 28, now attached to the intrusion beam 20 by the attachment means 32, and the inner body panel 12 defining the cavity whereby the expandable material 30 flows to join the damping member 28 with the body panel upon curing. The resulting structure includes the wall structure of the interior portion of the outer body panel joined to at least one damping member 28 with the aid of the now expanded material 30. After the expandable material 30 joins the damping member 28 with the body panel, the present invention accomplishes vibrational damping of the body panel by stabilizing or stiffening the vibrating components, absorbing sound energy, and reflecting and/or transferring sound energy to other portions of the automotive vehicle.

It is contemplated that the expandable material 30 comprises a structural foam, which is preferably heat-activated and expands and cures upon heating, typically accomplished by gas release foaming coupled with a cross-linking chemical reaction. The expandable material 30 is generally applied to portions of the damping member 28, such as the edges 34, in a solid or semi-solid state. The expandable material 30 may be applied to the edges 34 of the damping member 28 in a fluid state using commonly known manufacturing techniques, wherein the expandable material 30 is heated to a temperature that permits the expandable material 30 to flow slightly to aid in substrate wetting. The expandable material 30 hardens upon curing and adheres to the edges 34 of the damping member 28. Alternatively, the expandable material 30 may be applied to the damping member 28 as precast pellets, which are heated slightly to permit the pellets to bond to the edges 34 of the damping member 28. At this stage, the expandable material 30 is heated just enough to cause the expandable material 30 to flow slightly, but not enough to cause the expandable material 30 to thermally expand. Additionally, the expandable material 30 may also be applied to the damping member 28 by heat bonding/ thermoforming or by co-extrusion. Note that other stimuli activated materials capable of bonding can be used, such as, without limitation, an encapsulated mixture of materials that, when activated by temperature, pressure, radiation, photo-initiation, chemically, or other by other ambient conditions, will become chemically active. To this end, one aspect of the present invention is to facilitate a streamlined manufacturing process whereby the expandable material 30 can be placed along the damping member 28, or its edges 34, in a desired configuration wherein the damping member 28 is then attached to the intrusion beam 20 or, alternatively, directly to either or both of the inner body panel 12 or an interior portion of an outer body panel of the chosen panel assembly by the attachment means 32 at a point either before or during final assembly of the vehicle. In this regard, the system 10 of the present invention provides at least one, but possibly a plurality of, damping members 28 as shown in FIG. 3 which are attached to the chosen body panel assembly such that adequate clearance remains for existing and necessary hardware located inside a traditional automotive door cavity to provide window movement, door trim, etc. In addition, the present invention provides manufacturing flexibility in that the damping member 28 can be placed within the selected portion of the body panel assembly at either a supplier part facility, a pre-production manufacturing facility, or the final vehicle assembly plant.

The expandable material 30 that may have foamable characteristics is generally an epoxy-based material, but may include an ethylene copolymer or terpolymer, such as with an alpha-olefin. As a copolymer or terpolymer, the molecule is composed of two or three different monomers, i.e., small molecules with high chemical reactivity that are capable of linking up with similar molecules.

A number of epoxy-based structural reinforcing foams are known in the art and may also be used to produce the expandable material 30 of the present invention. A typical structural foam includes a polymeric base material, such as an epoxy resin or ethylene-based polymer which, when compounded with appropriate ingredients (typically a blowing agent and perhaps a curing agent and filler), typically expands and cures in a reliable and predictable manner upon the application of heat or another activation stimulus. The resulting material has a low density and sufficient stiffness to impart desired rigidity to a supported article. From a chemical standpoint for a thermally-activated material, the structural foam is usually initially processed as a thermoplastic material before curing. After curing, the structural foam typically becomes a thermoset material that is fixed and incapable of flowing.

An example of a preferred structural foam formulation is an epoxy-based material that may include polymer modificis such as an ethylene copolymer or terpolymer that is commercially available from L&L PRODUCTS, INC. of Romeo, Mich., under the designations L5206, L5207, L5208 and L5209. One advantage of the preferred structural foam materials over prior art materials is the preferred materials can be processed in several ways. Possible processing techniques for the preferred materials include injection molding, extrusion or extrusion with a mini-applicator extruder. This enables the creation of part designs that exceed the capability of most prior art materials.

While the preferred materials for fabricating the expandable material 30 have been disclosed, the expandable material 30 can be formed of other materials provided that the material selected is heat-activated or otherwise activated by an ambient condition (e.g. moisture, pressure, time or the like) and expands in a predictable and reliable manner under appropriate conditions for the selected application. One such material is the epoxy based resin disclosed in U.S. patent application Ser. No. 09/268,810, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, polyurethane materials with high glass transition temperatures, and mixtures or composites that may include even metallic foams such as an aluminum foam composition. See also, U.S. Pat. Nos. 5,766,719; 5,755,486; 5,575,526; 5,932,680 (incorporated herein by reference). In general, the desired characteristics of the expandable material 30 include high stiffness, high strength, high glass transition temperature (typically greater than 70 degrees Celsius), and good adhesion retention, particularly in the presence of corrosive or high humidity environments. In this manner, the expandable material 30 does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly. Still further, the selected expandable material 30 may comprise conductive properties wherein the expandable material 30 is activated by the application of heat through spot welding and other welding techniques known in the prior art.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be active at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels. While temperatures encountered in an automobile assembly body shop ovens may be in the range of 148.89° C. to 204.44° C. (300° F. to 400° F.), and paint shop oven temps are commonly about 93.33° C. (215° F.) or higher. If needed, blowing agents or activators can be incorporated into the composition to cause expansion at different temperatures outside the above ranges. Generally, prior art expandable foams have a range of expansion ranging from approximately 100 to over 1000 percent. The level of expansion of the expandable material may be increased to as high as 1500 percent or more, but is typically between 0% and 300%. In general, higher expansion will produce materials with lower strength and stiffness.

The automotive body panel damping system 10 disclosed in the present invention may be used in a variety of applications where vibrational reduction and damping is desired. The system 10 has particular application in automotive body panel applications where the overall weight of the structure being reinforced is a critical factor and there is a need for vibrational and/or acoustical damping. For instance, the system 10 may be used to increase the vibrational damping and/or structural strength of aircraft doors, marine vehicles, building structures, automotive body panels, doors, hatches, or other similar objects. In the embodiment illustrated in FIG. 1, the system 10 is used as part of an automobile door assembly for damping selected areas of the outer door panel from vibration and movement, but may also be utilized in conjunction with other outer body panels that have viewable exterior surfaces, rockers, cross-members, chassis engine cradles, radiator/rad supports, and other impact bars in automotive vehicles.

As best illustrated in FIG. 3, the automotive body panel damping system 10 is suitable for placement within a body panel of an automotive vehicle that does not have an intrusion beam. In this embodiment, at least one damping member 28 is provided with a suitable amount of a expandable material 30 molded on the edges 34 of the member 28 for attachment directly to either or both of an inner body panel 12 or the interior portion of an outer body panel 50 of an automotive body panel assembly. The damping member 28 having the expandable material 30 is adhered or attached directly to either or both of the inner body panel 12 and interior portion of the outer body panel 50 through attachment means 32, such as an interlock, snap-fit, friction fit interference fit assembly or an adhesive material well known in the art. It is contemplated that the damping member 28 can be configured, designed, or shaped in any desired form for placement of the expandable material 30 corresponding to the chosen cavity or space defined between the inner body panel 12 and the outer body panel. It will be appreciated that the system 10 of the present invention may be used for vibrational damping of other areas or body panels of an automobile such as a hatch, cargo door, third door, hood, fender, trunk, or any other panel area that comprises the exterior of an aircraft or automotive vehicle. In these applications, the shape and the number of needed damping members 28 as well as placement of the expandable material 30 along the at least one edge 34 of the damping members 28 will be dictated by the shape and desired application area that required damping.

In yet another embodiment, the expandable material 30 is provided in an encapsulated or partially encapsulated form, which may comprise a pellet, which includes an expandable foamable material, encapsulated or partially encapsulated in an adhesive shell, which could then be applied to the damping member 28 in a desired configuration. An example of one such system is disclosed in commonly owned, co-pending U.S. application Ser. No. 09/524,298 ("Expandable Pre-Formed Plug") now U.S. Pat. No. 6,422,575 hereby incorporated by reference. In addition, pre-formed patterns may also be employed such as those made by extruding a sheet (having a flat or contoured surface) and then die cutting it according to a predetermined configuration.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

A number of advantages are realized in accordance with the present invention, including, but not limited to, the ability to manufacture an automotive body panel damping system for placement in an automotive vehicle for delivery and assembly at a vehicle assembly plant without the need for application of pumpable products, wet chemical products, patch applications, and multiple sets of tools, such as those required to practice the prior art.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An assembly for damping vibration of a portion of an automotive vehicle body, comprising:
    (a) a first automotive vehicle body panel opposing a second automotive vehicle body panel;
    (b) a damping member having at least one wall generally perpendicular to the first body panel wherein the at least one wall includes a first edge opposite a second edge, the first edge adjacent the first panel and wherein said damping member comprises at least two spaced apart walls joined together by said at least one wall, which is an X-shaped cross wall; and
    (c) an expandable material disposed upon a substantial portion of the at least one wall wherein the expandable material is adapted for radial expansion with respect to the at least one wall for joining the first panel with the damping member.

2. The assembly as claimed in claim 1, wherein said damping member has a height dimension and a width dimension that varies along said height dimension.

3. The assembly as claimed in claim 1, wherein said damping member comprises at least two spaced apart walls joined together by said at least one wall, which is a cross wall.

4. The assembly as claimed in claim 1, wherein said expandable material expands upon exposure to heat and wherein the expandable material is applied to the damping member with a mini-applicator.

5. The assembly as claimed in claim 1, wherein said expandable material is disposed along said edges of said damping member.

6. The assembly as claimed in claim 1, wherein at least one of said edges of said damping member is fixedly attached to said first body panel prior to expansion of the expandable material.

7. The assembly as claimed in claim 1, wherein said second panel has an inner portion and an outer portion, said inner portion further comprising an intrusion beam fixedly bridging said inner portion.

8. The assembly as claimed in claim 7, wherein at least one of said edges of said damping member is fixedly attached to said intrusion beam.

9. An assembly for damping vibration of at least a portion of an automotive vehicle body, comprising:
    (a) an automotive vehicle body panel of an automotive vehicle door;
    (b) an intrusion beam attached to the automotive vehicle body panel;
    (c) a damping member fixedly attached to the intrusion beam, the damping member having at least two spaced walls joined together by at least one cross wall, the at least two spaced walls and the at least one cross wall disposed generally perpendicular to the body panel, the at least two spaced walls having an edge adjacent the panel and the cross wall having an edge adjacent the panel; and
    (d) an expandable foam disposed upon a substantial portion of the at least one cross wall, the expandable foam being expanded radially with respect to the at least one cross wall to extend between said body panel and the edge of the at least one cross wall for joining said damping member to said body panel.

10. The assembly as claimed in claim 9, wherein said damping member has a height dimension and a width dimension that varies along said height dimension.

11. The assembly as claimed in claim 9, wherein said at least one cross wall of said damping member is generally X-shaped.

12. The assembly as claimed in claim 9, wherein said expandable material is suitable for expansion upon exposure to heat.

13. The assembly as claimed in claim 9, wherein said damping member is fixedly attached to said body panel.

14. The assembly as claimed in claim 9, wherein said body panel has an inner portion and an outer portion.

15. An assembly as claimed in claim 9, wherein said damping member is fixedly attached to said intrusion beam.

16. A vibration damping system for an automotive vehicle, comprising:
    (a) a body panel assembly of a door of the automotive vehicle, the assembly having an inner body panel and an outer body panel, said outer body panel having an interior portion and an exterior portion; and (b) at least one damping member having at least one wall, the at least one damping member being attached to at least one of the inner body panel and the outer body panel, the at least one wall being generally perpendicular to the at least one of the inner body panel and the outer body panel, the at least one wall including at least one exterior edge adjacent the at least one of the inner body panel and the outer body panel; and (c) an expandable material disposed along at least a portion of said edge of said damping member, said expandable material in sealing contact with a substantial portion of said at least one wall of said damping member, said expandable material suitable for radial expansion with respect to said at least one wall upon exposure to heat thereby bonding said at least one edge of said damping member to said at least one of said inner body panel and said outer body panel for vibrational damping.

17. The system as claimed in claim 16, wherein said expandable material is a polymer material having foamable characteristics.

18. The system as claimed in claim 16, wherein said expandable material is a heat activated expandable polymer material having foamable characteristics.

19. The system as claimed in claim 16, wherein said expandable material is an expandable polymer material that is generally free of tack to the touch.

20. The system as claimed in claim 16, wherein said expandable material is an expandable polymeric foam that can be activated at a temperature encountered in an automotive vehicle paint operation oven.

21. The system as claimed in claim 16, wherein said at least one damping member extends from a top of the at least one of said inner body panel and said outer body panel to a bottom of the at least one of said inner body panel and said outer body.

22. An assembly for damping vibration of a portion of an automotive vehicle body, comprising:

(a) a first automotive vehicle body panel opposing a second automotive vehicle body panel, wherein said second panel has an inner portion and an outer portion, said inner portion further comprising an intrusion beam fixedly bridging said inner portion;

(b) a damping member having at least one wall generally perpendicular to the first body panel wherein the at least one wall includes a first edge opposite a second edge, the first edge adjacent the first panel; and (c) an expandable material disposed upon a substantial portion of the at least one wall wherein the expandable material is adapted for radial expansion with respect to the at least one wall for joining the first panel with the damping member.

23. The assembly as claimed in claim 22, wherein said damping member has a height dimension and a width dimension that varies along said height dimension.

24. The assembly as claimed in claim 22, wherein said damping member comprises at least two spaced apart walls joined together by said at least one wall, which is a cross wall.

25. The assembly as claimed in claim 22, wherein said damping member comprises at least two spaced apart walls joined together by said at least one wall, which is an X-shaped cross wall.

26. The assembly as claimed in claim 22, wherein said expandable material expands upon exposure to heat and wherein the expandable material is applied to the damping member with a mini-applicator.

27. The assembly as claimed in claim 22, wherein said expandable material is disposed along said first and second edges of said damping member.

28. The assembly as claimed in claim 22, wherein at least one of said edges of said damping member is fixedly attached to said first body panel prior to expansion of the expandable material.

29. The assembly as claimed in claim 22, wherein at least one of said edges of said damping member is fixedly attached to said intrusion beam.

* * * * *